(12) United States Patent
Spittle et al.

(10) Patent No.: US 9,428,639 B2
(45) Date of Patent: Aug. 30, 2016

(54) FLOCCULANT COMPOSITION FOR DEWATERING SOLIDS LADEN SLURRIES

(75) Inventors: Kevin S. Spittle, Vero Beach, FL (US); Gary L. Bowers, Jonesborough, TN (US)

(73) Assignee: PROFILE PRODUCTS LLC, Buffalo Grove, IL (US)

( * ) Notice: Subject to any disclaimer, the term of this patent is extended or adjusted under 35 U.S.C. 154(b) by 1449 days.

(21) Appl. No.: 12/899,650

(22) Filed: Oct. 7, 2010

(65) Prior Publication Data

US 2011/0094968 A1    Apr. 28, 2011

Related U.S. Application Data

(60) Provisional application No. 61/253,977, filed on Oct. 22, 2009.

(51) Int. Cl.

| | |
|---|---|
| *C02F 1/56* | (2006.01) |
| *C02F 11/14* | (2006.01) |
| *C02F 1/28* | (2006.01) |
| *B01J 20/24* | (2006.01) |
| *B01J 20/26* | (2006.01) |
| *C08L 1/02* | (2006.01) |
| *C08L 97/02* | (2006.01) |
| *C08L 33/26* | (2006.01) |

(52) U.S. Cl.
CPC .............. *C08L 33/26* (2013.01); *B01J 20/24* (2013.01); *B01J 20/267* (2013.01); *C02F 1/285* (2013.01); *C02F 1/56* (2013.01); *C02F 11/14* (2013.01); *C08L 1/02* (2013.01); *C08L 97/02* (2013.01); *B01J 2220/445* (2013.01); *B01J 2220/4825* (2013.01); *B01J 2220/68* (2013.01); *C08L 2201/54* (2013.01); *C08L 2205/025* (2013.01); *C08L 2205/03* (2013.01)

(58) Field of Classification Search
CPC .......... C02F 11/14; C02F 1/56; C02F 1/285; C02F 5/10; C02F 1/025; C02F 1/28; C02F 1/281; C02F 1/286; C02F 1/52; C02F 1/5281; C02F 5/105; C02F 11/12; B01J 20/02; B01J 20/22; B01J 20/24; B01J 20/26; B01J 20/265; B01J 20/267; B01J 20/28; B01J 20/282; B01J 20/285; B01J 2220/40; B01J 2220/42; B01J 2220/44; B01J 2220/445; B01J 2220/46; B01J 2220/4831; B01J 2220/68; B01J 2220/4845; C08L 1/00; C08L 1/02; C08L 33/24; C08L 33/26; C08L 97/00; C08L 97/02; C08L 2205/025; C08L 2205/03; C08L 2201/54

USPC ......... 502/402, 401, 400; 210/702–736, 737, 210/738; 252/175, 176, 180, 181

See application file for complete search history.

(56) References Cited

U.S. PATENT DOCUMENTS

| | | | |
|---|---|---|---|
| 3,235,490 A * | 2/1966 | Goren ........................... | 210/728 |
| 4,224,149 A * | 9/1980 | Balcerski et al. ............ | 210/728 |
| 5,089,142 A * | 2/1992 | Turunc .......................... | 210/728 |
| 5,681,475 A * | 10/1997 | Lamensdorf et al. ........ | 210/728 |
| 6,076,299 A * | 6/2000 | Spittle et al. ........................ | 47/9 |
| 6,593,460 B1 * | 7/2003 | Huttermann ............. | C08H 6/00 524/76 |
| 2006/0169455 A1 * | 8/2006 | Everett et al. ................. | 166/295 |
| 2011/0252701 A1 * | 10/2011 | Soane ....................... | C10L 5/00 44/621 |
| 2011/0281721 A1 * | 11/2011 | Bedard .................. | B01D 53/02 502/79 |

FOREIGN PATENT DOCUMENTS

| | | | | |
|---|---|---|---|---|
| CA | 2 089 623 A1 | 8/1993 | | |
| CA | 2 517 063 A1 | 9/2004 | | |
| JP | 2005224672 A * | 8/2005 | .............. | C02F 11/14 |

OTHER PUBLICATIONS

Englich machine translation of JP 2005-224672 A "Dehydration treatment system for thermal power station, supplies polymer flocculent into fly-ash sludge settled in sedimentation tank, and performs dehydration of clinker and fly-ash sludge in dehydration tank"; Aug. 25, 2005.*

* cited by examiner

*Primary Examiner* — Joseph Drodge
*Assistant Examiner* — Nader Hossaini
(74) *Attorney, Agent, or Firm* — Brooks Kushman P.C.

(57) ABSTRACT

Flocculant compositions containing a cellulosic compound, a superabsorbant polymer, and a flocculant, are useful for preventing the formation of an aqueous phase during the shipping of fly ash slurries.

22 Claims, No Drawings

FLOCCULANT COMPOSITION FOR DEWATERING SOLIDS LADEN SLURRIES

CROSS-REFERENCE TO RELATED APPLICATIONS

This application claims the benefit of U.S. provisional Application No. 61/,253,977 filed Oct. 22, 2009. The disclosure(s) of which is (are) incorporated in its entirety by reference herein.

BACKGROUND OF THE INVENTION

1. Field of the Invention

The invention is directed to flocculant compositions which serve both as an absorbant and flocculant in high solids slurries, particularly slurries of fly ash.

2. Background Art

Coal fired energy plants produce large quantities of fly ash, a somewhat undefined composition which generally contains large amounts of silica but may also include numerous other inorganic compounds, and at times traces of organic compounds as well. The fly ash is often stored or transported as a wet solid ("saturated fly ash") or a concentrated aqueous slurry, for use as an additive to cementitious compositions, as a filler in non-critical applications where filler makeup is less stringent, and for disposal as landfill. Due to its chemical makeup, saturated fly ash can be a serious contaminant. Fly ash because of its chemical makeup is considered a hazardous material by the Environmental Protection Agency. The physical gradation is heavily weighted toward silt and sand with a smaller portion of the composition of clay sized particles. Fly ash is highly dispersed particles with poor agglomeration moisture retention properties. When loaded in a rail car for transport to a waste disposal facility, the ash shifts, settles and perks water to the surface. The water that perks out is highly turbid with fly ash and can be spilled from the rail car while in transit. The invention is designed to absorb, flocculate, solidify the surface layer and to filter the highly turbid ash laden water to prevent an accidental discharge or spill from the rail car while in transit to the disposal facility. During storage and transit, despite the high solids content, some separation of fly ash and an aqueous phase occurs. This aqueous phase is very turbid, containing a large amount of suspended ash and dissolved (principally) inorganics, is corrosive, and can cause staining of surfaces which it contacts. The aqueous phase easily "sloshes" out or discharges through openings, cracks, rivets, drain holes, and the like, particularly during rail transit. During such transit, the vibration of the wheels against the tracks, particularly at rail joints, as well as acceleration, deceleration, and transit around curves maintains ash particles in suspension in an aqueous phase.

Typical ash management technique is to place a liner in an open top rail car, this liner has 4 flaps, each end and two in the middle that are folded closed and bungied to secure load while in transit to the hazardous waste disposal facility. While in transit the ash settles and highly turbid ash laden water perks or rises to the top, making its way out of the closed liner. Once on the surface of the liner it can be blown out of the car or sloshed out during stops and starts, shifting from front to back or side to side while in transit. It can also seek out the path of least resistance, making its way over the liner but still within the car seeking out any opening, rivet, cracked weld or drain hole in the bottom of the car. It's a requirement that no ash leave the rail car while in transit.

It would be desirable to reduce the propensity of water in high solids fly ash or fly ash dispersions to separate, and also to remove suspended particles from a separated aqueous phase or prevent their formation as a dispersed phase.

SUMMARY OF THE INVENTION

It has now been surprisingly and unexpectedly discovered that the propensity of high solids fly ash and fly ash slurries to separate, can be minimized, while at the same time reducing the suspended fine solids in any remaining aqueous phase. These and other objects are achieved through an absorbant/flocculant composition of particles containing a large proportion of paper and/or wood, preferably recycled paper and wood, a crosslinked polyacrylamide copolymer gel, and anionic linear polyacrylamide flocculant, and compositions containing minimally the superabsorbant polymer and flocculant. The compositions may also include preferably porous inorganic particles.

DETAILED DESCRIPTION OF THE PREFERRED EMBODIMENT(S)

The invention is designed to absorb, flocculate, solidify the surface layer and to filter the highly turbid ash laden water to prevent an accidental discharge or spill from the rail car while in transit to the disposal facility.

The inventive material is strategically placed within the car to prevent the accidental discharge or release of ash laden water. There are five areas of primary concern the corners of the rail car and the overlap seam of the liner. Any one of these could allow ash laden water to release from the liner if the perked water remains in a fluid state. The inventive material is distributed with a concentration in both ends and corners of the bag within the car and a quantity of granules is placed within the center of the bag from front to back with a distributed concentration that will allow, once hydrated, continuous contact with each. There are several functions of the system, absorption of the free water at the surface of the ash, flocculation of the turbid ash laden water, and release of a hardening polymer that binds the surface layer, preferably to a depth of 6 to 12 inches, more preferably 8 to 12 inches. The final phase of the product is the filtration and absorption of any surface water prior to its discharge through the liner. The rate of material needed is based on the moisture content of the Fly ash, with the minimal amount necessary to protect the ends and to run the length of the car. The rate of application varies from as little as 100 lbs to as much as 300 pounds, preferably 150 to 250 lbs per car.

There are numerous absorbent materials in the market place, they provide moisture absorption but no flocculation, solidification or filtration of the fly ash.

Super absorbents are very slippery when wet, but as the base material of the inventive composition is recycled waste paper material or wood fibers, this is much safer to work with and to walk on during the installation and closing of the car liners than that of a superabsorbent alone. the inventive material can be used and applied while it is raining, where as super absorbents alone would limit its use while raining because of the potential slip hazard.

Our material is extremely light requiring a few hundred pounds to protect the car versus tons of other absorbent and sealants like bentonite. It requires a ton of bentonite to close the load, and the cost of the material is only one factor, the weight of the material needed to secure the load is expensive to transport and to pay a tipping fee to the waste disposal facility. We can secure the load at 10% of weight of bentonite required to do so.

The particles of the subject invention are preferably granules, either formed directly by granulating processes or by comminuting the composition from pelletized form. However, flakes, extruded shapes, etc. may also be used provided they contain all the necessary ingredients. Other means of forming granules or other shapes, all of which are well known to those skilled in the art, may be used as well.

The cellulosic component may present in the form of granules, flakes, fibers, or in any other suitable form, and preferably consists of wood fibers preferably in the form of sawdust, wood shavings, refined wood fibers or the like, and also paper fibers, preferably either formed by defiberizing paper during recycling or by comminution into flakes, thin strips, etc. The cellulosic component may also be derived from other sources such as plant waste, cotton processing waste, paper shredding and recycling, or any source of cellulosic, fibrous material, including agricultural products, and is preferably in a water-absorbent relatively porous form. Wood particles and paper particles or flakes from recycled or waste components are preferably used, although "virgin" products are also useful. The amount of cellulosic fiber is from 50-90 weight percent, more preferably 70-90 weight percent, and most preferably about 83-87 weight percent. In the context of the invention, "cellulosic" includes "lignocellulosic" and "lignin." A preferred composition contains predominantly cellulosic material derived from waste paper, with a small amount of wood shavings and sawdust.

Suitable cellulosic material also includes fibers of coniferous and deciduous woods, cotton, wool, flax, jute, coconut, hemp, straw, grass, and other fibers available directly from natural sources, as well as chemically modified natural fibers, for example chemically 10 modified cellulose fibers, cotton fibers, etc. Suitable natural fibers also include abaca, cantala, caroa, henequen, istle, Mauritius, phormium, bowstring, sisal, kenaf, ramie, roselle, sunn, cadillo, kapok, broom root, coir, crin vegetal, and piassaua. These lists of natural fibers are illustrative and not limiting. Examples of chemically modified fibers also include azlon (regenerated natural proteins), 15 regenerated cellulose products including cellulose xanthate (rayon), cellulose acetate, cellulose triacetate, cellulose nitrate, alginate fibers, casein-based fibers. All these fibers and materials, even protein aceous materials may be used herein, i.e. the protein materials may be substituted for the cellulosic material.

The crosslinked water absorbant is preferably a crosslinked polyacrylamide polymer such as is available from JRM Chemical under the name of "Co-polymer Gel". The polymers may be homopolymers or copolymers, and may also be other types of superabsorbant polymers and copolymers such as polyacrylic acid copolymers, polyacrylate copolymers, and the like. These types of highly water absorbant polymers are sometimes known as "superslurpers" because they are capable of absorbing many times their weight of water, for example 10 times to 400 times its weight, preferably at least 20 times its weight, more preferably in the range of 200 to 350 times its weight, in distilled water. The degree of absorption in other than distilled water may differ qualitatively, but is similar. They are also termed "superabsorbant polymers." Copolymer crosslinked polyacrylamides which absorb roughly 300-350 times their weight of water have proven to be very effective. The water absorbant polymer is preferably contained in the composition in an amount of 1 to 99% by weight, more preferably 5-80% by weight, and in order of increasing preference, 5-70%, 5-60%, 5-50%, 5-40%, 5-30%, 5-25%, and 10-20% by weight, and most preferably about 12-18% by weight. A variety of water absorbant polymers are known in the art.

The particle size of the superabsorbant may vary over a wide range. However, it is desirable to have a particle size which is small enough to provide sufficient surface area to absorb water quickly, but not so small that the particles "fish eye" (hydrate so rapidly that dried polymer is encapsulated by hydrated polymer, which reduces effectiveness and may become very slipper, presenting a slip hazard). Conversely, large particles have very little surface area, and in this case the absorption is too slow to positively impact the system. A preferred particle size range is 100 to 1400 µm, more preferably 200 to 1000 µm and most preferably 400 to 800. The actual mean particle size is readily determined by simple laboratory experiments with saturated fly ash and particles of a variety of mean particle sizes. The preferred superabsorbant has a particle size distribution lying mostly between 500-750 µm, with a maximum of 4% of the particles being greater than 1000 µm.

The flocculant is contained in the composition in an amount effective to flocculate substantially all suspended solids from an aqueous phase of the high solids slurry. In the case of saturated fly ash dispersions, the amount is preferably from 0.01 to 10 weight percent, more preferably 0.05 to 2% by weight, yet more preferably 0.5 to 1.5 weight percent, and most preferably about 1 weight percent. Larger or smaller amounts may be useful depending upon the average size of the fly ash or other particles, particularly the size distribution of small particles, since larger particles need not be flocculated in order to settle out effectively. The flocculant may be any suitable flocculant, including neutral, anionic, and cationic flocculants. A preferred flocculant is a linear anionic polyacrylamide polymer or copolymer, an example of which is "Anionic Linear Polymer of Acrylamide" available from JRM Chemical. However, flocculants of other chemical types are also suitable, as also are naturally occurring flocculants such as chitosan. A variety of flocculants are known to those skilled in the art. The mean particle size preferably is between 100 and 2000 µm, more preferably between 200 and 1500 µm. The preferred flocculant has particles predominately in the range of 300-800 µm, with <2% being greater than 1700 µm.

The composition preferably also contains a surfactant, particularly to facilitate preparation of the product in its final form, preferably a granulate. The surfactant may be a non-ionic surfactant, i.e. a polyoxyalkylene surfactant, or an anionic, cationic, zwitterionic, etc. surfactant. Alkylbenzene sulfonates and the like may be used. A mixture of surfactants may be useful in some applications. The surfactant, when present, is preferably present in an amount of from 0.01 to 5 weight percent, more preferably 0.05 to 2 weight percent, and more preferably 0.1 to 1 weight percent. A preferred surfactant is Lanawet™ 916, used at 0.44 weight percent, available from Specialty Chemical. The surfactant facilitates wetting of the cellulosic component such that water absorption may be more rapid.

The particles of the subject invention may be prepared by any suitable method. For example, all components may be mixed together dry, and sufficient water added to produce an extrudable or agglomeratable mixture, which may be chopped to produce small granules or, if in larger diameter extrudate, may produce pellets which are optionally then comminuted into granules, or agglomerated by means of a pin mixer, rolling drum, or disk pelletizer, or other suitable technique. The particles are preferably relatively irregular particles having an average size of from 0.1 mm to 5 mm, more preferably 0.3 mm to 3 mm, and most preferably about 0.5 mm to 1.5 mm. However, distinct extruded shapes such as cylinders, or extrudates in the form of hollow cylinders, hollow squares, stars, etc. may also be used. In some methods of preparation, in fluidized beds or pans, the shape may be essentially spherical. Shapes in the form of flakes, ribbons, etc. are also useful.

A preferred method of preparation is hammer milling of cellulosic material and surfactant, combining the hammer milled product with the superabsorbant, pelletizing, drying, and granulating (comminuting). The granules are then conveyed to a bagger where the flocculant is dusted onto the granules. However, the flocculant may be added at any suitable time in the process of preparing the particles.

The amount of granules added to the high solids slurry is calculated by routine testing of a slurry with varying amounts of the composition added. The amount is sufficient if the aqueous phase becomes visually clear, or if only a "filtered" aqueous phase separates by means of the layer of hardened material which forms at the surface or just below the surface. The amount of aqueous phase has, in general, also decreased due to absorption of water by superabsorbant. Preferably, little or no aqueous phase forms. An amount of the composition which completely eliminates the aqueous phase is thus also suitable. In general, amounts, in volume percent, is from 0.1 to 25 volume percent, more preferably 0.1 to 10 volume percent, based on the aqueous phase present (supernatant) or expected to be present. However, the amounts may be higher or lower depending upon the nature of the particular high solids slurry, and their relative amounts. Determination of the effective amount is easily determined by one skilled in the art by simple, routine tests.

For a car with a load of 200,000 pounds of fly ash, an amount of 200 lbs. of the inventive composition has proven effective. However, the actual amount is somewhat dependent upon the actual water content of the ash, and is related to the amount of supernatant expected. An amount of 2.5% of this amount has been proven effective. Thus, based on an average car load of 200,000 lbs, an amount of the inventive composition of 50 to 500 lbs, and with increasing order of preference, 70-450, 80-430, 100-400, 125-350, 150-300, and 150-250 lbs, can be used.

The compositions of the claimed invention may be used without a cellulosic component, and without a surfactant, but this is not preferred. When used as a composition without a cellulosic component, the only required ingredients are the superabsorbant and the flocculant. These are preferably present in a weight ratio of 100:0.01, more preferably 100:0.05 and yet more preferably from 100:0.1 to 100:10, with each numerical and fractional numerical range within these ranges being described herein.

When used without a cellulosic component, an inorganic particulate, preferably a porous inorganic particulate, may be cojointly used, for example but not by limitation, as a carrier. Suitable particles include ground limestone, dolomite, various naturally occurring silicates and phylosilicates, mica, vermiculite, expanded mica, clay granules, calcined clay granules, sand, crushed stone, crushed quartz, etc. Other solid particles may be used as well. Some or all of these may also be used in cellulosic compositions. Such particles, whether acting as a carrier or not, help prevent the possibility of slips by personnel.

The invention is also directed to a process for minimizing formation of an aqueous layer, particularly an aqueous layer containing fly ash particulates, by adding a polymer-containing composition which, when added to saturated fly ash, can form a relatively hard layer at the surface of the fly ash, extending into the subsurface for an appreciable depth, preferably at least one inch, more preferably minimally 2, 3, 4, 5, 6, 7, or 8 inches, and maximally essentially without limit, but preferably 10-16 inches, more preferably about 12 inches. The depth is partially dependent upon the amount of composition used, the depth of the saturated fly ash in the car, and its water content. The polymer added may be a natural polymer or synthetic polymer or polymer mixture, provided that it can provide the requisite layer. The solid layer formed is relatively hard, the hardness of which can vary over a wide range. A suitable hardness is, for example, one where the solid layer can be dug out by hand, but with some difficulty.

EXAMPLE

Cellulosic material which is predominately waste paper with a small percentage of sawdust and wood shavings and a minor amount of surfactant are hammer milled and combined with superabsorbant polymer which is a crosslinked polyacrylamide gel obtained from JRM Chemical. The composition contains sufficient water for pelletization and is pelletized and dried. The pellets are mechanically reduced to granules. The granulated particles are conveyed to a bagger where a linear anionic polyacrylamide flocculant is dusted onto the granules. The granulated composition contains about 83.6% cellulosic material, 15% superabsorbant, and 1% flocculant and 0.4% surfactant, all in weight percent.

The composition is added in varying quantities to saturated fly ash which has been allowed to separate into a turbid aqueous phase above the bulk of the fly ash solids. An amount of the composition which causes the aqueous phase to be relieved of its turbidity is found, and preferably at least this amount of the composition is added to other saturated fly ash slurries from the same source. The volume of aqueous supernatant is observed to be decreased, and the ability of the saturated fly ash slurry to slush about is compromised.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A solid composition suitable for absorbing water and flocculating fine particles from a solids-containing slurry containing fine particles in suspension in an aqueous phase, comprising:
    a) a fibrous cellulosic component comprising at least one of wood particles or paper particles present in an amount of 50 to 90% by weight based on the weight of the solid composition;
    b) a superabsorbent polymer present in an amount of 5 weight percent or more based on the weight of the solid composition; and
    c) a flocculating agent.

2. The solid composition of claim 1, wherein the fibrous cellulosic component is present in an amount of from 70 to 90 weight percent based on the weight of the solid composition.

3. The solid composition of claim 1, wherein the superabsorbent polymer is present in an amount of from 5 to 25 weight percent relative to the total weight of the solid composition.

4. The solid composition of claim 1, wherein the superabsorbent polymer is a crosslinked polyacrylamide polymer.

5. The solid composition of claim 1, wherein the flocculant is present in an amount of from 0.05 to 2 weight percent.

6. The solid composition of claim 1, wherein the flocculant comprises an anionic linear polyacrylamide polymer.

7. The solid composition of claim 1, which is in the form of pellets or granules.

8. The solid composition of claim 1, which further comprises at least one surfactant.

9. A process for preparation of a solid composition of claim 1, comprising mixing ingredients a), b), c), and optionally further ingredients, and granulating, flaking, pelletizing, or any combination thereof.

10. The solid composition of claim 1, wherein the cellulosic component consists of wood fibers.

11. The solid composition of claim 1, which is in the form of a granulate, agglomerate, pellet, or extrudate.

12. The solid composition of claim 1, wherein the solid composition is in the form of particles having a mean size of 0.1 mm to 10 mm.

13. The solid composition of claim 1, further comprising an inorganic particulate component.

14. The solid composition of claim 1, further comprising a surfactant in an amount of from 0.01 to about 5 weight percent based on the total weight of the solid composition.

15. The solid composition of claim 1, which, when added to a solids-containing slurry, flocculates fine particles, absorbs water, and forms a solid layer on top of the solids-containing slurry.

16. The solid composition of claim 1, wherein the superabsorbent polymer is a crosslinked polymer.

17. The solid composition of claim 1, wherein the amount of fibrous cellulosic component is from 83-87 weight percent.

18. The solid composition of claim 17, wherein the superabsorbent polymer is present in an amount of from 5-18 weight percent.

19. A process for reducing the volume of an aqueous phase in wet or moist fly ash and flocculating particles suspended in the aqueous phase, comprising adding a solid composition of claim 1 and allowing at least a portion of the aqueous phase to solidify.

20. A process for reducing the volume of an aqueous phase in an aqueous slurry, and also flocculating particles suspended in the aqueous phase, comprising adding a solid composition of claim 1 to the slurry.

21. The process of claim 20, wherein the amount of the solid composition added to the slurry is effective to reduce suspended solids in the aqueous phase to a level where the aqueous phase appears to be visually clear.

22. A solid composition suitable for absorbing water and flocculent fine particles from a solids-containing slurry containing fine particles in suspension in an aqueous phase, consisting of:
  a) a fibrous cellulosic component containing paper particles and/or wood particles in an amount of from 50 to 90% by weight based on the total weight of the solid composition;
  b) a superabsorbent polymer in an amount of 5 weight percent or more based on the weight of the solid composition;
  c) a flocculating agent;
  d) optionally, a surfactant; and
  e) optionally, an inorganic particulate.

* * * * *